United States Patent
Schiffbauer et al.

(10) Patent No.: US 12,360,325 B2
(45) Date of Patent: Jul. 15, 2025

(54) CONNECTOR STORAGE FOR SECURELY HOLDING AN UNUSED FIBER OPTIC CONNECTOR WHILE MINIMIZING THE CONTACT AREA BETWEEN THE CONNECTOR STORAGE AND THE CONNECTOR

(71) Applicant: PPC BROADBAND, INC., East Syracuse, NY (US)

(72) Inventors: Robert Schiffbauer, Olathe, KS (US); Peter Carapella, Fayetteville, NY (US); Steven M. Waldren, Roanoke, VA (US)

(73) Assignee: PPC BROADBAND, INC., East Syracuse, NY (US)

( * ) Notice: Subject to any disclaimer, the term of this patent is extended or adjusted under 35 U.S.C. 154(b) by 148 days.

(21) Appl. No.: 17/961,351

(22) Filed: Oct. 6, 2022

(65) Prior Publication Data
US 2023/0176309 A1 Jun. 8, 2023

Related U.S. Application Data

(60) Provisional application No. 63/252,856, filed on Oct. 6, 2021.

(51) Int. Cl.
*G02B 6/44* (2006.01)
(52) U.S. Cl.
CPC .................. *G02B 6/4471* (2013.01)
(58) Field of Classification Search
CPC .. G02B 6/3825; G02B 6/3897; G02B 6/3893; G02B 6/4292; G02B 6/3885; G02B 6/3849; G02B 6/4452; G02B 6/4471
See application file for complete search history.

(56) References Cited

U.S. PATENT DOCUMENTS

| 6,547,450 B2 | 4/2003 | Lampert |
| 7,198,409 B2 | 4/2007 | Smith et al. |

(Continued)

OTHER PUBLICATIONS

International Search Report and Written Opinion dated Jan. 19, 2023 in corresponding International Application No. PCT/US2022/045919, 13 pages.

*Primary Examiner* — John Bedtelyon
(74) *Attorney, Agent, or Firm* — MH2 TECHNOLOGY LAW GROUP LLP

(57) ABSTRACT

A connector storage includes a storage block including a plurality of chambers. Each of the plurality of chambers includes an open first end at a front wall and a substantially closed second end at a rear wall. The storage block is configured to include first voids and/or second voids between adjacent ones of the plurality of chambers. Each of the plurality of chambers includes a substantially circular perimeter wall that includes first and second wall portions between the respective chamber and respective ones of the first and second voids. The perimeter wall is configured to have a first diameter that is smaller than a second diameter of a circle that circumscribes corners of the fiber optic connector. The first and second wall portions are configured to deform into respective ones of the first and second voids to receive and securely grip the corners of the fiber optic connector while minimizing a contact area between the perimeter wall and the connector so as to reduce a force required to insert the connector into the storage block and remove the connector from the storage block.

24 Claims, 8 Drawing Sheets

(56) References Cited

U.S. PATENT DOCUMENTS

| | | |
|---|---|---|
| 7,407,330 B2 | 8/2008 | Smith et al. |
| 7,841,775 B2 | 11/2010 | Smith et al. |
| 7,903,922 B2 * | 3/2011 | Momotsu .............. G02B 6/3849 |
| | | 385/53 |
| 7,980,768 B2 | 7/2011 | Smith et al. |
| 8,210,756 B2 | 7/2012 | Smith et al. |
| 10,663,684 B2 | 5/2020 | Claessens et al. |
| 2008/0298764 A1 | 12/2008 | Bloodworth et al. |
| 2008/0317425 A1 | 12/2008 | Smith et al. |
| 2010/0034505 A1 | 2/2010 | Momotsu et al. |
| 2010/0132979 A1 | 6/2010 | Chen |
| 2010/0322580 A1 | 12/2010 | Beamon et al. |
| 2012/0251066 A1 | 10/2012 | Allen |

* cited by examiner

CONNECTOR STORAGE FOR SECURELY HOLDING AN UNUSED FIBER OPTIC CONNECTOR WHILE MINIMIZING THE CONTACT AREA BETWEEN THE CONNECTOR STORAGE AND THE CONNECTOR

CROSS-REFERENCE TO RELATED APPLICATION

This application claims the benefit of U.S. Provisional Application No. 63/252,856, filed Oct. 6, 2021, the disclosure of which is hereby incorporated by reference herein in its entirety.

TECHNICAL FIELD

The present disclosure generally relates to a connector storage for fiber optic connectors, which may be protected by dust caps, when the fiber optic connectors are not in use or are being stored.

BACKGROUND

Fiber optic connectors include a ferrule that permits positioning of the optical fiber held by the connector to receive and transmit signals another optical fiber or optical light source. It is desirable to keep the polished end faces of the ferrules as free of contaminants as much as possible to improve the transmission of light to and from the optical fiber held by the connector. Such contaminants may adversely impact the transmission of light to and from the optical fiber. The contaminants include, but are not limited to, dust and fingerprints. The end faces of the ferrules may be covered with dust caps to protect the polished end face of the optical fiber when not in use.

Further, when a fiber optic connector is not being used, the connector may be inserted into a storage adapter disposed at a bulkhead for storage or pre-wiring of a cross-connection point, an interconnection point, or some other type of telecommunications switching or connection equipment. Such storage adapters do not optically couple the fiber of the connector with another fiber. However, some conventional storage adapters are not able to receive the connector with a dust cap hi place covering the ferrule. Thus, although such storage adapters might provide some protection from contaminants to a single connector inserted into the adapter, these storage adapters are not as effective as a dust cap in protecting the polished end face of the ferrule.

Other conventional connector storage devices permit an unused connector to be stored with a dust cap. For example, Japanese Patent Publication JP-A 2000-193833 (the "'833 Japanese Publication") discloses a conventional optical fiber alignment board that stores unused connectors with a dust cap. As shown in FIG. 6, the optical alignment board 1a includes round through holes 1b that are sized to enable insertion and storage of an unused optical connector 5 that terminates an optical fiber 4, 4a, FIG. 6 illustrates through holes 1b and connectors 5 having a similar size. Because the through holes 1b do not protect the end of the connector 5 that extends through the through holes 1b, the '833 Japanese Publication discloses that a dust cap (not shown) is necessarily attached to the connector 5 to protect the connector 5 from dust when not in use. The '833 Japanese Publication further discloses an embodiment of an alignment board that includes a connector storage adapter for holding an unused optical connector in a manner that prevents dust adhesion without the use of a dust cap.

Similarly, Japanese Patent Publication JP-A 2000-241629 (the "'629 Japanese Publication") discloses a conventional fiber management unit for unused connectors. As shown in FIGS. 7A-7C, the '629 Japanese Publication discloses a fiber management unit 36 that includes a connector anchoring part 36c in which multiple slits 36s are formed and a plurality of guides 36b with curved surfaces 36g. An unused optical connector 35 is inserted into a slit 36s via an opening of the slit 36s in the side surface of the connector anchoring part 36c, thereby sandwiching a wide-diameter portion 35a on the end of the optical connector 35 within the slit 36s, which keeps the connector from becoming dislodged from the slit 36s. Once the optical connector 35 is anchored in the connector anchoring part 36c, a removable cover 36d is attached to the connector anchoring part 36c, thereby blocking the opening of the slit 36s in the side surface of the connector anchoring part 36c, keeping the optical connector from becoming dislodged from the slit 36s, and covering the end of the upward-facing optical connector 35 to protect the connector from dust and the like. A protective cap 36i is also attached to the end of the optical connector 35.

U.S. Pat. No. 6,983,095 discloses another conventional connector storage module for a fiber distribution network. As shown in FIG. 8, the module includes a faceplate with storage receptacles for receiving and storing connectorized pigtails that are not being used. FIG. 8 illustrates the storage receptacles and connectors having a similar size.

In yet other conventional connector holders, as shown in FIG. 1, the conventional connector holders may be formed from a homogenous material that requires the fiber optic connector housing to have particular dimensions, such as, but not limited to, a specific housing height, specific housing width, and specific clip width/height. As shown in FIG. 1, a conventional connector holder 902 defines openings 938 that are machined into a solid block of material wherein the openings 938 require a specific connector height 912 and connector width 914 as well as specific width/height for the connector clip. The conventional connector holder 902 may make it difficult for a technician to insert and remove connectors from the holder because the amount of friction created by the matching surface areas of the connector and the holder. Additionally, a snug fit between the holder and the connector could create a vacuum effect that makes removal of the connector from the holder more difficult.

It may be desirable to provide a connector storage configured to securely hold a fiber optic connector, with or without a dust cap, while minimizing the contact area between the connector storage and the connector such that a force required to insert the connector into the storage and remove the connector from the storage is reduced. It also may be desirable to provide a connector storage configured to receive a locking clip of the fiber optic connector when the fiber optic connector is inserted into the storage such that the clip can be inserted into the chamber beyond the front wall and does not extend beyond an outer surface of the top wall, thereby protecting the clip from damage during storage of the connector. It further may be desirable to provide a connector storage that permits a technician to visually observe from an exterior of the storage whether the fiber optic connector is active.

SUMMARY

According to various embodiments of the disclosure, a connector storage for securely holding a fiber optic connector while minimizing a contact area between the connector storage and the connector includes a storage block including a plurality of chambers. The storage block is configured to include a front wall, a rear wall, a top wall, a bottom wall, a first end wall, and a second end wall. Each of the plurality of chambers is configured to include an open first end at the front wall and a substantially closed second end at the rear wall. The storage block is configured to include first voids between adjacent ones of the plurality of chambers and the top wall and second voids between the adjacent ones of the plurality of chambers and the bottom wall; partial first voids between end ones of the plurality of chambers, the top wall, and a respective one of the first end wall and the second end wall; and partial second voids between end ones of the plurality of chambers, the bottom wall, and a respective one of the first end wall and the second end wall. Each of the plurality of chambers includes a substantially circular perimeter wall, and the perimeter wall includes first wall portions between the respective chamber and respective ones of the first voids and partial first voids and second wall portions between the respective chamber and respective ones of the second voids and partial second voids. Each of the plurality of chambers is configured to receive a fiber optic connector via the open first end. The perimeter wall is configured to have a first diameter that is smaller than a second diameter of a circle that circumscribes corners of the fiber optic connector. The first wall portions and the second wall portions are configured to deform into respective ones of the first voids, the partial first voids, the second voids, and the partial second voids to receive and securely grip the corners of the fiber optic connector. The top wall of the storage block is configured to includes a plurality of notches at the front wall, and each of the notches is configured to extend into a respective one of the chambers. Each of the notches is configured to receive a locking clip of the fiber optic connector when the fiber optic connector is inserted into the chamber of the storage block such that the dip can be inserted into the chamber beyond the front wall and does not extend beyond an outer surface of the top wall, thereby protecting the dip from damage during storage of the connector. Each of the plurality of chambers is configured to securely hold the fiber optic connector while minimizing a contact area between the perimeter wall and the connector so as to reduce a force required to insert the connector into the storage block and remove the connector from the storage block.

According to various aspects of the above embodiment of the connector storage, the storage block is a single piece of unitary construction.

According to various aspects of the above embodiments of the connector storage, the storage block comprises a silicone rubber block.

According to various aspects of the above embodiments of the connector storage, each of the plurality of chambers is configured to receive an LC fiber optic connector.

According to various aspects of the above embodiments of the connector storage, the substantially closed second end includes an opening through the rear wall that permit airflow between an interior of the chamber and an exterior of the storage block.

According to various embodiments of the disclosure, a connector storage for securely holding a fiber optic connector while minimizing a contact area between the connector storage and the connector includes a storage structure including a compartment configured to receive a fiber optic connector. The compartment is configured to include an open first end at a front wall and a substantially closed second end at a rear wall, the storage structure is configured to include a plurality of voids surrounding the compartment, and the compartment includes a substantially circular perimeter wall. The perimeter wall includes wall portions between the compartment and each of the plurality of voids, and the compartment is configured to receive a fiber optic connector via the open first end. The perimeter wall is configured to have a first diameter that is smaller than a second diameter of a circle that circumscribes corners of the fiber optic connector, and the wall portions are configured to deform into respective ones of the voids to receive and securely grip the corners of the fiber optic connector. The compartment is configured to securely hold the fiber optic connector while minimizing a contact area between the perimeter wall and the connector so as to reduce a force required to insert the connector into the storage structure and remove the connector from the storage structure.

According to various aspects of the above embodiments of the connector storage, a top wall of the storage structure is configured to include a notch at the front wall that is configured to extend into the compartment, and the notch is configured to receive a locking clip of the fiber optic connector when the fiber optic connector is inserted into the compartment of the storage structure such that the clip can be inserted into the compartment beyond the front wall and does not extend beyond an outer surface of the top wall, thereby protecting the clip from damage during storage of the connector.

According to various aspects of the above embodiments of the connector storage, the storage structure is a single piece of unitary construction.

According to various aspects of the above embodiments of the connector storage, the storage structure comprises a silicone rubber block.

According to various aspects of the above embodiments of the connector storage, the compartment is configured to receive an LC fiber optic connector.

According to various aspects of the above embodiments of the connector storage, the compartment is configured to receive an SC fiber optic connector.

According to various aspects of the above embodiments of the connector storage, the substantially closed second end includes an opening through the rear wall that permit airflow between an interior of the compartment and an exterior of the storage block.

According to various aspects of the above embodiments of the connector storage, the compartment includes a plurality of compartments and wherein the voids include first voids between adjacent ones of the plurality of compartments and a top wall of the storage structure and second voids between the adjacent ones of the plurality of compartments and a bottom wall of the storage structure. The storage structure is configured to include partial first voids between end ones of the plurality of compartments, the top wall, and a respective one of a first end wall and a second end wall, and the storage structure is configured to include partial second voids between end ones of the plurality of compartments, the bottom wall, and a respective one of the first end wall and the second end wall.

According to various embodiments of the disclosure, a connector storage for securely holding a fiber optic connector while minimizing a contact area between the connector storage and the connector includes a storage structure including an engagement structure. The engagement structure is configured to receive an engagement feature of a fiber optic connector and to deform and securely grip the engagement feature of the fiber optic connector. The engagement structure is configured to securely hold the fiber optic connector while minimizing a contact area between the engagement structure and the connector so as to reduce a force required to insert the connector into the storage structure and remove the connector from the storage structure.

According to various aspects of the above embodiments of the connector storage, the engagement structure includes a substantially circular perimeter wall;

According to various aspects of the above embodiments of the connector storage, the perimeter wall is configured to have a first diameter that is smaller than a second diameter of a circle that circumscribes the engagement features of the fiber optic connector.

According to various aspects of the above embodiments of the connector storage, a top wall of the storage structure is configured to include a receiving feature at a front wall of the storage structure that is configured to extend into the engagement structure. The receiving feature is configured to receive a locking clip of the fiber optic connector when the fiber optic connector is inserted into the engagement structure such that the clip can be inserted into the engagement structure beyond the front wall and does not extend beyond an outer surface of the top wall, thereby protecting the clip from damage during storage of the connector.

According to various aspects of the above embodiments of the connector storage, the storage structure is a single piece of unitary construction.

According to various aspects of the above embodiments of the connector storage, the storage structure comprises a silicone rubber block.

According to various aspects of the above embodiments of the connector storage, the compartment is configured to receive an LC fiber optic connector.

According to various aspects of the above embodiments of the connector storage, the compartment is configured to receive an SC fiber optic connector.

According to various aspects of the above embodiments of the connector storage, the engagement structure is configured to include an open first end at a front wall of the storage structure and a substantially closed second end at a rear wall of the storage structure.

According to various aspects of the above embodiments of the connector storage, the substantially closed second end includes an opening through the rear wall that permit airflow between an interior of the engagement structure and an exterior of the storage block.

According to various aspects of the above embodiments of the connector storage, the storage structure is configured to include a void proximate the engagement structure, and the void is configured to permit the engagement structure to deform into the void to receive and securely grip the engagement feature of the fiber optic connector.

According to various aspects of the above embodiments of the connector storage, the engagement structure includes a plurality of engagement structures and wherein the void includes first voids between adjacent ones of the plurality of engagement structures and a top wall of the storage structure and second voids between the adjacent ones of the plurality of engagement structures and a bottom wall of the storage structure. The storage structure is configured to include partial first voids between end ones of the plurality of engagement structures, the top wall, and a respective one of a first end wall and a second end wall; and the storage structure is configured to include partial second voids between end ones of the plurality of engagement structures, the bottom wall, and a respective one of the first end wall and the second end wall.

BRIEF DESCRIPTION OF THE DRAWINGS

Further advantages and features of the present disclosure will become apparent from the following description and the accompanying drawings, to which reference is made. In which are shown.

DETAILED DESCRIPTION

Figure 1:
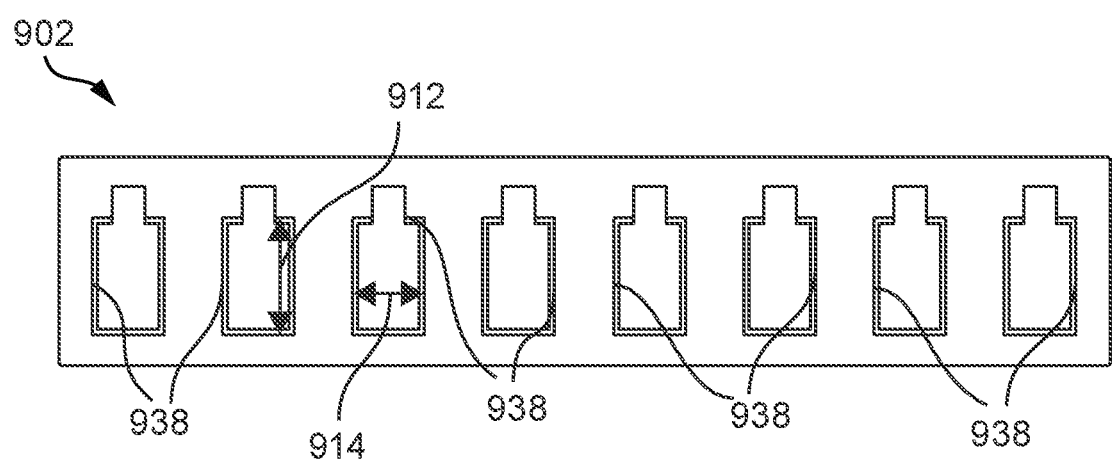
FIG. 1 is a front view of a conventional connector storage.

Reference will now be made in detail to presently preferred embodiments and methods of the present disclosure, which constitute the best modes of practicing the present disclosure presently known to the inventors. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

As shown in FIGS. 2A-3B, an exemplary fiber optic connector storage 100 may include a generally rectangular storage structure or holding structure 102, for example, a silicone rubber block, configured to receive and hold one or more fiber optic connectors. The storage structure 102 includes a front wall 103, a rear wall 104, a top wall 105, a bottom wall 106, a first end wall 107, and a second end wall 108. The first end wall 107 and the second end wall 108 extend from the front wall 103 to the rear wall 104 in a first direction and from the top wall 105 to the bottom wall 106 is a second direction that is perpendicular to the first direction. It should be appreciated that, in some aspects, the top wall 105 may be oriented as a bottom wall and the bottom wall 106 may be oriented as a top wall with respect to a support structure. The top wall 105, the bottom wall 106, the first end wall 107, and the second end wall 108 may have a substantially similar thickness. In some exemplary aspects, the thickness may fall, for example, within a range of about 1.0 mm to about 1.2 mm.

Figure 4A:
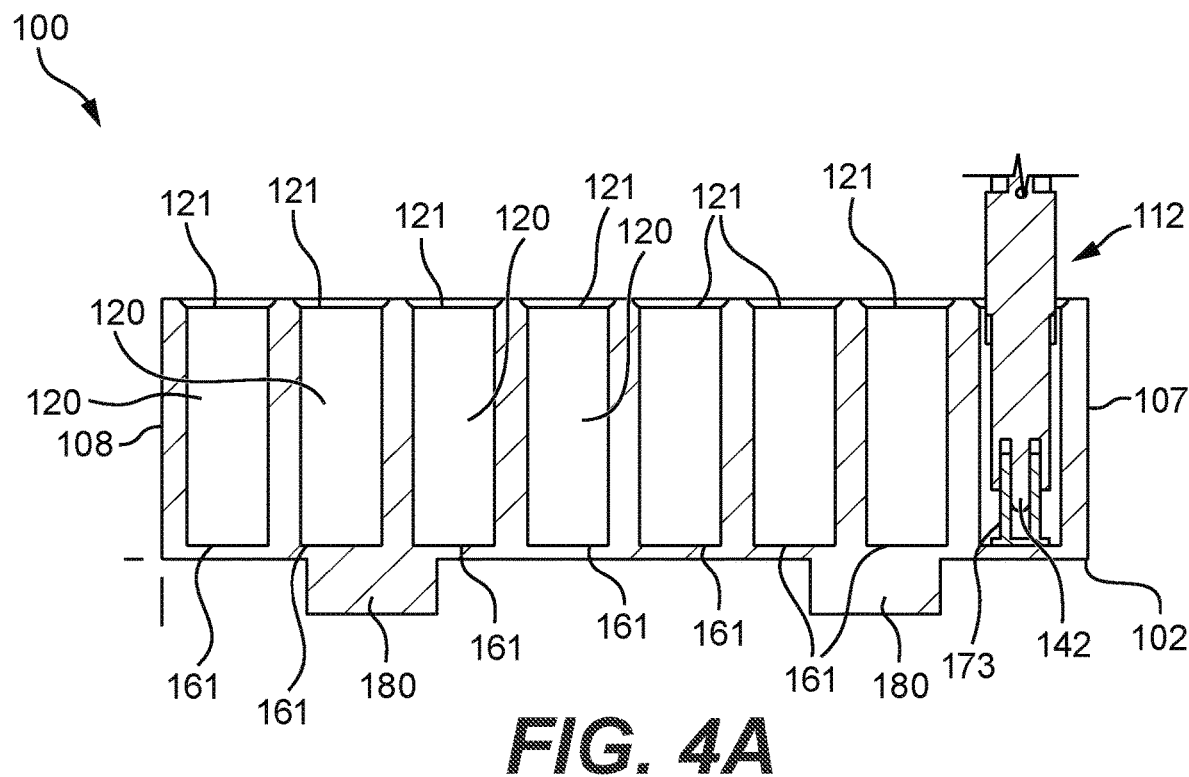
FIG. 4A is a cross-sectional view of the exemplary connector storage shown in FIG. 2A taken along line 4A-4A of FIG. 3A.

The storage structure 102 includes a plurality of engagement structures, for example, open-ended chambers or compartments 120, for example, cylindrical chambers or compartments, that each include an opening 121 at the front wall 103 and a perimeter wall 135 that extends from the opening 121 to the rear wall 104. The chambers 120 and openings 121 may have a circular or substantially circular cross-section, which may extend the length of the chambers 120 from the front wall 103 to the rear wall 104. For example, in some aspects, the perimeter of the chambers 120 and the openings 121 may be a polygon with a sufficient number of sides, for example, 16 sides, to substantially resemble a circle. It should be appreciated that the polygon may have more or less than 16 sides, depending on the size of the openings 121 and chambers 120. In some aspects, the openings 121 may be tapered, as best shown in FIG. 4A.

Figure 2A:
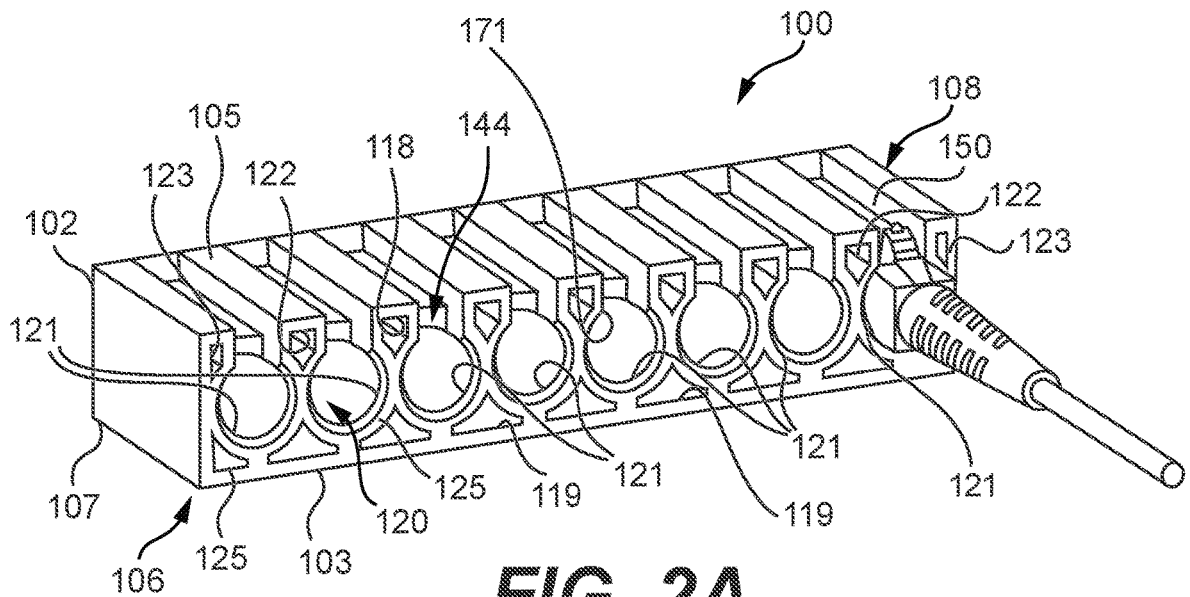
FIG. 2A is a front isometric view of an exemplary connector storage according to various aspects of the present disclosure.
Figure 2B:
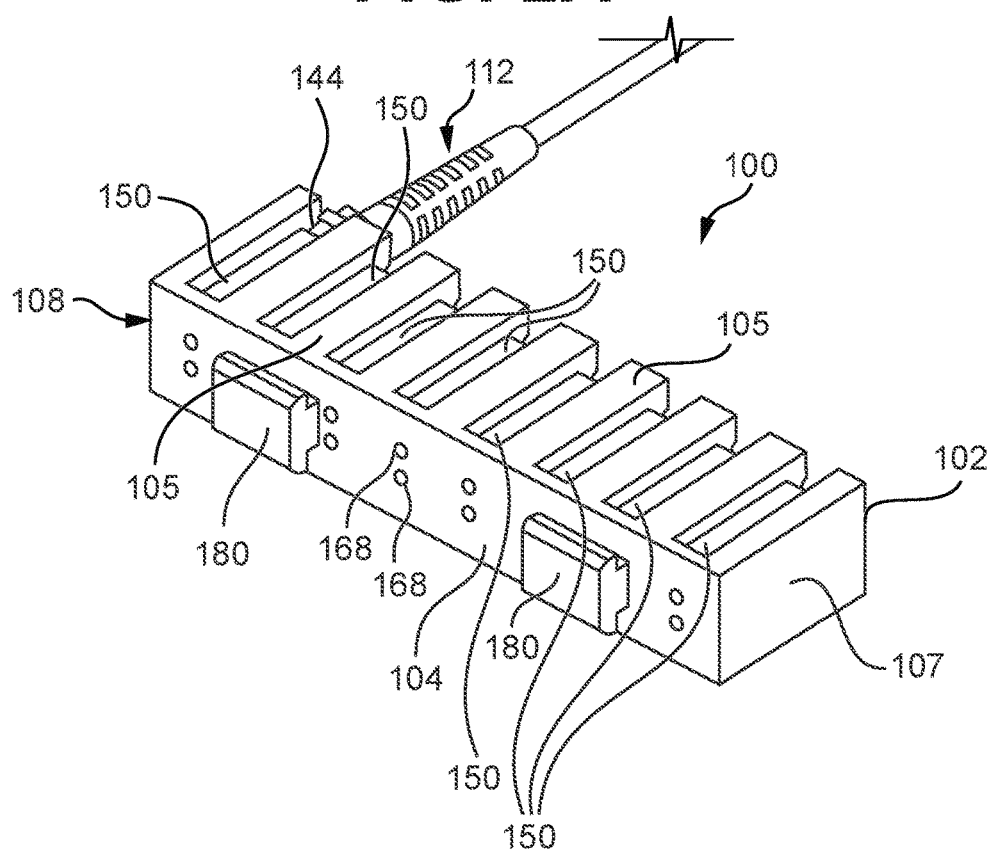
FIG. 2B is a rear isometric view of the exemplary connector storage shown in FIG. 2A.

The openings 121 and the chambers 120 are each sized and configured to receive a fiber optic connector 112 such as, for example, an LC (Lucent Connector) fiber optic connector, as illustrated in FIGS. 2A and 2B. It should be understood that the chambers 120 may be sized to accommodate various other connectors including, but not limited to, SC (Subscriber Connector) fiber optic connectors.

The storage structure 102 includes first cutout portions 118 that define a plurality of first voids, cavities, or spaces 122 and/or second cutout portions 119 that define a plurality of second voids, cavities, or spaces 124. The first voids 122 may be between adjacent chambers 120 and adjacent the top wall 105. Partial first voids 123 may be between the end ones 120' of the plurality of chambers 120 and a respective one of the first end wall 107 and the second end wall 108. The second voids 124 may be between adjacent chambers 120 and adjacent the bottom wall 106. Partial second voids 125 may be between the end ones 120' of the plurality of chambers 120 and a respective one of the first end wall 107 and the second end wall 108. The first voids 122, partial first voids 123, second voids 124, and partial second voids 125 may be open at the front wall 103 and extend to the rear wall 104.

It should be appreciated that in some aspects, the storage structure 102 includes first voids 122 and partial first voids 123 but no second void 124 or partial second void 125. In other aspects, the storage structure 102 includes second voids 124 and partial second voids 125 but no first voids 122 or partial first voids 123. In still other aspects, the storage structure 120 may include only one first void 122 or partial first void 123 adjacent each chamber 120 and/or only one second void 124 or partial second void 125 adjacent each chamber 120.

Figure 3A:
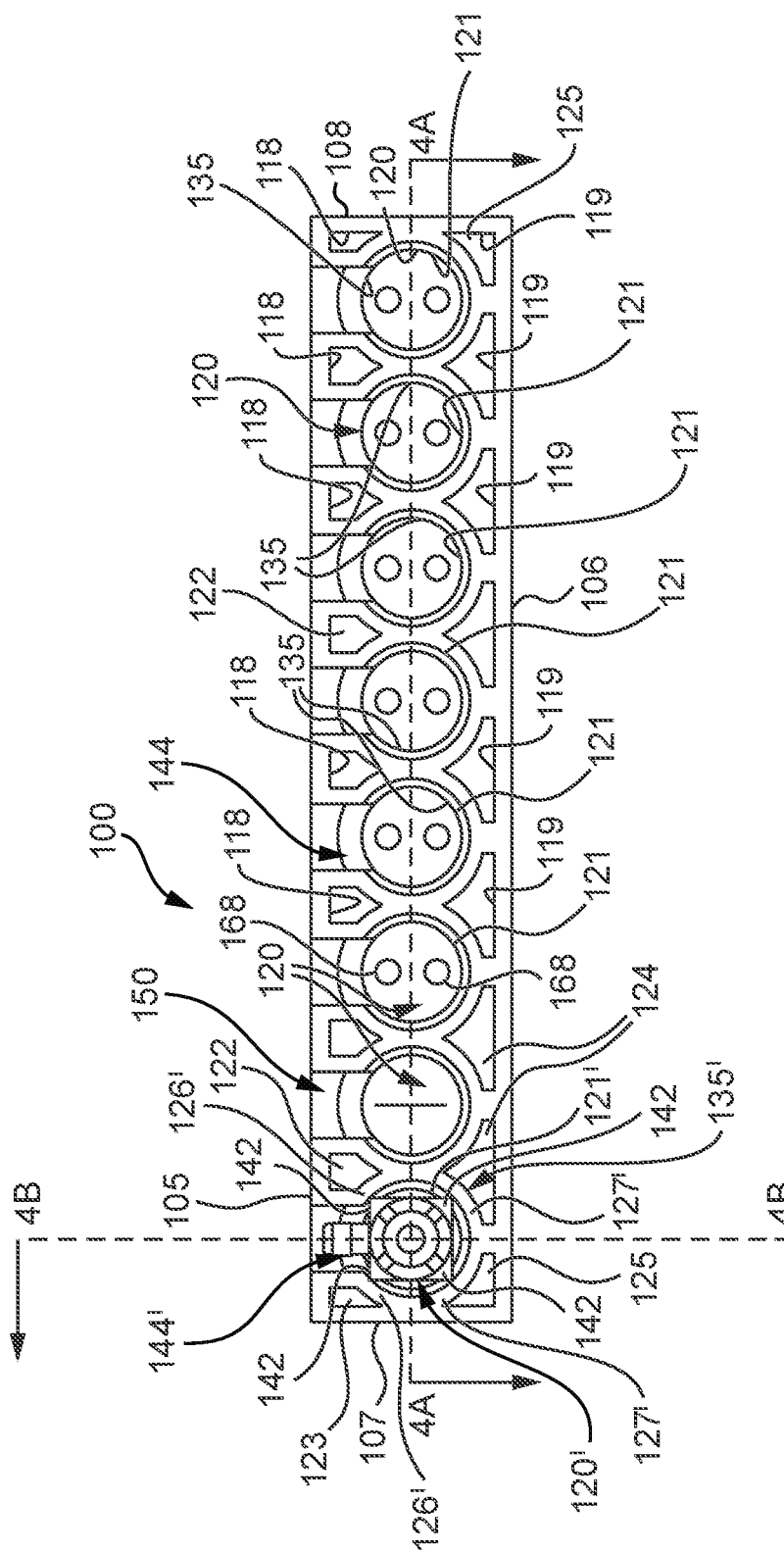
FIG. 3A is a front view of the exemplary connector storage shown in FIG. 2A.

The top wall 105 of the storage structure 102 may include a plurality of elongated recesses 150 extending from the rear wall 104 to and through the front wall 103. As shown in FIG. 3A, each one of the recesses 150 is aligned with one of the chambers 120 and openings 121. For example, each recess 150 may be aligned with a diametrical centerline of one of the chambers 120 and openings 121. The front wall 103 includes a plurality of notches 144, with each of the notches 144 being aligned with and extending from one of one of the recesses 150 to provide a continuous void in the top wall 105 of the storage structure 102 from the rear wall 104 to an interior of a respective one of the chambers 120.

Figure 3B:
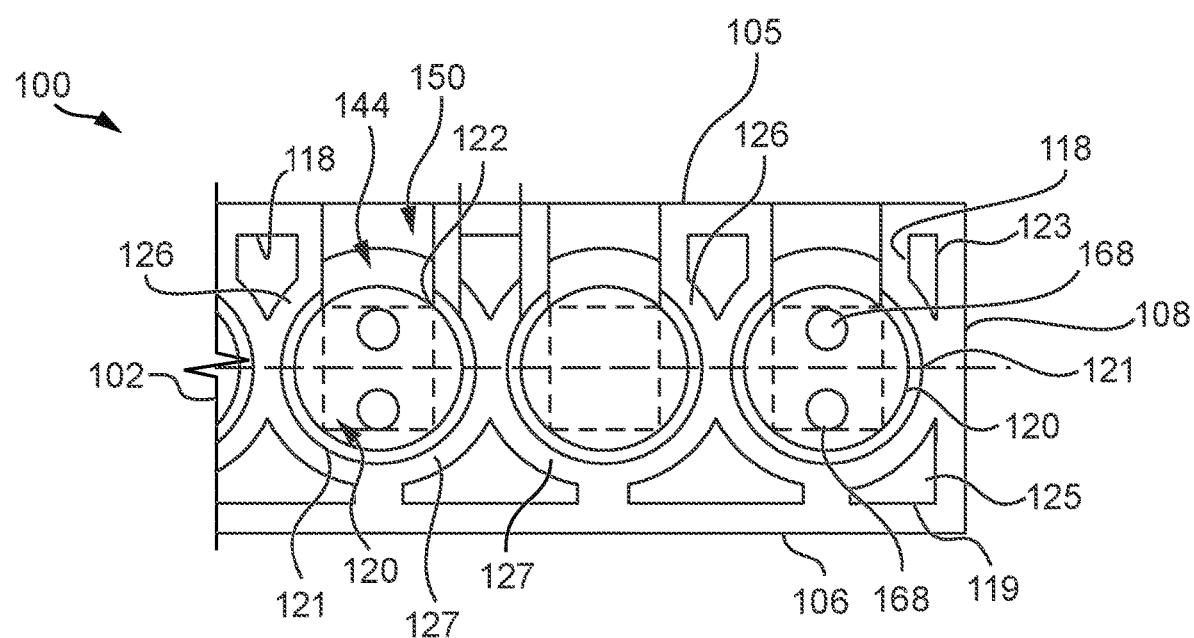
FIG. 3B is an enlarged partial view of the exemplary connector storage shown in FIG. 2A.

Referring to FIGS. 2A and 2B, the fiber optic connector storage 100 is configured to hold one or more fiber optic connectors 112 when the fiber optic connector 112 is not in use or "static." As best illustrated in FIGS. 3A and 3B, the perimeter wall 135 of each storage structure 102 may include one or more first wall portions or engagement features 126 between each chamber 120 and the first voids 122 and/or partial first voids 123. Additionally or alternatively, the perimeter wall 135 of each storage structure 102 may include one or more second wall portions or engagement features 127 between each chamber 120 and the second voids 124 and/or partial second voids 125. In some aspects, the first and second wall portions 126, 127 may have a thickness that is substantially similar to the thickness of the top wall 105, the bottom wall 106, the first end wall 107, and the second end wall 108, which may fall, for example, within a range of about 1.0 mm to about 1.2 mm.

Figure 4B:
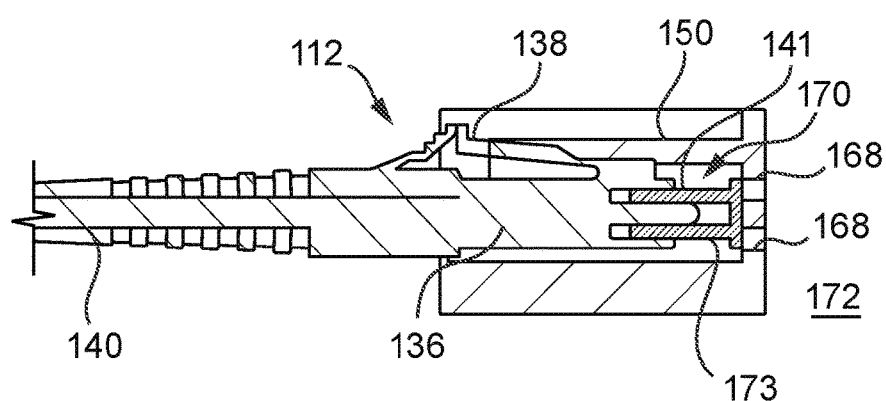
FIG. 4B is a cross-sectional view of the exemplary connector storage shown in FIG. 2A taken along line 4B-4B of FIG. 3A.

Referring now to FIGS. 4A-4B, the fiber optic connector 112 may be an LC connector that includes a connector housing 136 having a dip 138, a boot 140, and a ferrule 142 holding an optical fiber (not shown). The housing 136 of the fiber optic connector 112 may have a square or substantially square portion 137 having four corners 142. The chambers 120 of the storage structure 102 are configured to receive and securely hold the fiber optic connector 112, as discussed in more detail below.

Each of the plurality of chambers 120 includes an opening 121 configured to receive the fiber optic connector 112. The storage structure 102 includes notches 144 at an outer region 171 of the opening 121 of the chambers 120 that is substantially aligned with the diametrical centerline of the chamber 120 and opening 121. The notch 144 is configured to receive the clip 138 of the fiber optic connector 112 when the fiber optic connector 112 is fully inserted into the first chamber 120 of the connector storage 100 such that the dip 138 can be inserted into the chamber 120 beyond the front wall 103 and does not extend beyond an outer surface 105' of the top wall 105.

Referring again to FIGS. 3A and 3B, the chambers 120 may be configured to secure the fiber optic connector 112 to the storage structure 102 via a friction fit or interference fit relationship between the corners 142 of the fiber optic connector 112 and the first and second wall portions 126, 127 of the perimeter wall 135 of the chamber 120. For example, the corners 142 of the fiber optic connector 112 may be more rigid than the first and second wall portions 126, 127 of the perimeter wall 135, and a circle that circumscribes the corners 142 of the fiber optic connector 112 may have a diameter that is greater than a diameter of the chamber 120 and/or the opening 121. When the connector 112 is inserted into the chamber 120, the corners 142 of the fiber optic connector 112 are configured to deform the first and second wall portions 126, 127 such that the first and second wall portions 126, 127 securely grip the fiber optic connector 112. For example, the first voids 122, partial first voids 123, second voids 124, and/or partial second voids 125 permit the first and second wall portions 126, 127 to deform into the respective first voids 122, partial first voids 123, second voids 124, and/or partial second voids 125. Because the gripping area between the first and second wall portions 126, 127 and the fiber optic connector 112 is limited to the corners 142 of the fiber optic connector 112, the gripping area is minimized and the force required to insert the fiber optic connector 112 into and remove the fiber optic connector 112 from the chamber 120 is reduced when compared with a connector holder that grips an area greater than the corners 142.

It should be appreciated that in some aspects, the corners 142 of the fiber optic connector 112 may engage the first and second wall portions 126', 127' of the perimeter wall 135' of the chamber 120' to secure the fiber optic connector 112 to the storage structure 102 via a friction fit or interference fit relationship without deforming the first and second wall portions 126', 127' of the perimeter wall 135'. In some aspects, the chambers 120 and openings 121 may be configured to move from a first position or rest position to a second position or expanded position when a fiber optic connector is fully inserted into the respective chamber. For example, the chambers 120 and openings 121 may be substantially circular in the first position. In the second position, the chambers 120 and openings 121 may be circular but have a larger diameter than in the first position or the chambers 120 and openings 121 may become non-circular shaped, for example, oval shaped.

Referring again to FIGS. 4A and 4B, the plurality of chambers 120 extend from the openings 121 at the front wall 103 to substantially closed ends 161 at the rear wall 104 of the storage structure 102. The perimeter walls 125 of the chambers 120 may be flexible such that the walls 125 are configured to deform when a fiber optic connector is inserted into the chambers 120, as described above. In some aspects, the storage structure 102 of the present disclosure may be injection molded such that the storage structure 102 is a single piece of unitary constructions. It is also understood that a dual-shot injection molding process may be implemented wherein the perimeter walls 125 of the plurality of chambers 120 are formed from a polymeric material having a lower modulus of elasticity compared to the polymeric material used for the front wall 103, the rear wall 104, the top wall 105, the bottom wall 106, the first end wall 107, and/or the second end wall 108.

In various embodiments of the disclosure, the plurality of chambers 120 may have a length from the openings 121 at the front wall 103 to the substantially closed end 161 at the rear wall 104 of the storage structure 102 that is sized to receive the fiber optic connector 112 with a dust cap 173 coupled with the connector 112 to cover the ferrule 141. Also, with the dust cap 173 attached, the connector 112 may be inserted into a chamber 120 such that the clip 138 is inserted into the chamber 120 beyond the front wall 103 and does not extend beyond an outer surface 105' of the top wall 105, as illustrated in FIG. 4B. Thus, the storage structure 102 is configured to protect the clip 138 of the connector from damage. It should be appreciated that the dust cap 173 may comprise a translucent material that permits a technician to visually observe whether the fiber in the ferrule 141 is active because the light traveling on the fiber illuminates the dust cap 173.

As best illustrated in FIGS. 2B and 3A, the substantially closed end 161 of one or more of the plurality of chambers 120 may include at least one opening 168 there through. The illustrated embodiment includes two openings 168 that are offset from a center of the substantially circular closed end 161 of the chambers 120. The openings 168 permit airflow between an interior 170 of the chambers 120 and an exterior 172 of the chambers 120 and the storage structure 102. The openings 168 thus prevent a vacuum effect from occurring when the connector 112 is inserted into a chamber 120 with the openings. The storage structure 102 may include a mounting structure 180 configured to mount the storage structure 102 to a panel or bulkhead of a fiber distribution system, as would be understood by persons skilled in the art.

In various aspects, the storage structure 102 may comprise a translucent material. Because the openings 168 are offset from a center of the substantially circular closed end 161 of the chambers 12, the openings 168 are also configured to be offset from the dust cap 173 of the connector 122 being inserted into the chamber 120. Thus, light traveling on the fiber that illuminates the dust cap 173 may also illuminate a region 169 of the substantially closed end 161 of the chamber 120 such that a technician can visually observe whether the fiber in the ferrule 141 is active by viewing from the exterior 172 of the storage structure 102.

In use, as illustrated in FIG. 3A, a first chamber 120' of the plurality of chambers 120 includes an opening 121' configured to receive the fiber optic connector 112. The storage structure 102 includes a notch 144' at an outer region 171 of the opening 121' of the first chamber 20' that is substantially aligned with the diametrical centerline of the first chamber 120' and opening 121'. The recess 144' is configured to receive the clip 138 of the fiber optic connector 112 when the fiber optic connector 112 is fully inserted into the first chamber 120' of the connector storage 100 such that the clip 138 can be inserted into the chamber 120' beyond the front wall 103 and does not extend beyond an outer surface 105' of the top wall 105.

The first chamber 120' may be configured to secure the fiber optic connector 112 to the storage structure 102 via a friction fit or interference fit relationship between the corners 142 of the fiber optic connector 112 and the first and second wall portions 126', 127' of the perimeter wall 135' of the chamber 120'. For example, the corners 142 of the fiber optic connector 112 may be more rigid than the first and second wall portions 126', 127' of the perimeter wall 135', and a circle that circumscribes the corners 142 of the fiber optic connector 112 has a diameter greater than a diameter of the chamber 120' and/or the opening 121'. Thus, the first and second wall portions 126', 127' are configured to deform in the regions that are proximate to the corners 142 of the fiber optic connector 112 when the connector 112 is inserted into the first chamber 120'. It should be appreciated that in some aspects, the corners 142 of the fiber optic connector 112 may engage the first and second wall portions 126', 127' of the perimeter wall 135' of the chamber 120' to secure the fiber optic connector 112 to the storage structure 102 via a friction fit or interference fit relationship without deforming the first and second wall portions 126', 127' of the perimeter wall 135'.

Figure 5A:
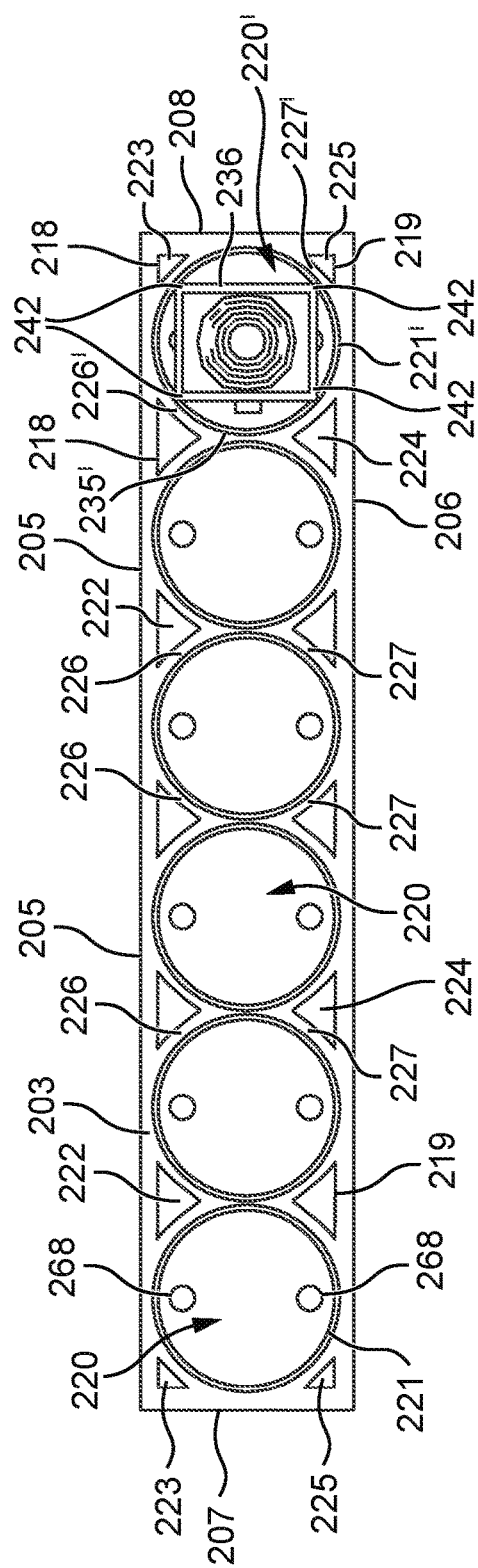
FIG. 5A is a front view of another exemplary connector storage in accordance with various aspects of the disclosure.
Figure 5B:
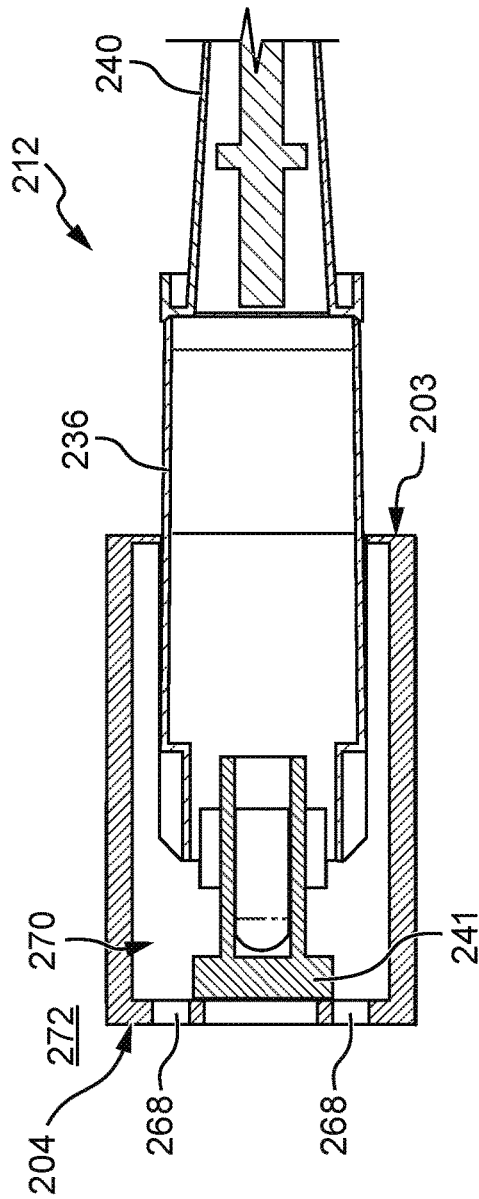
FIG. 5B is a cross-sectional view of the exemplary connector storage shown in FIG. 5A.
Figure 6:
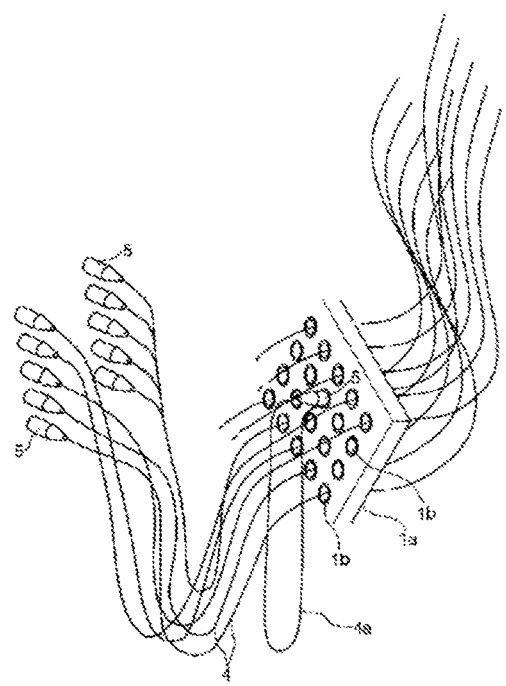
FIG. 6 is a perspective view of a conventional optical fiber alignment board.
Figure 7A:
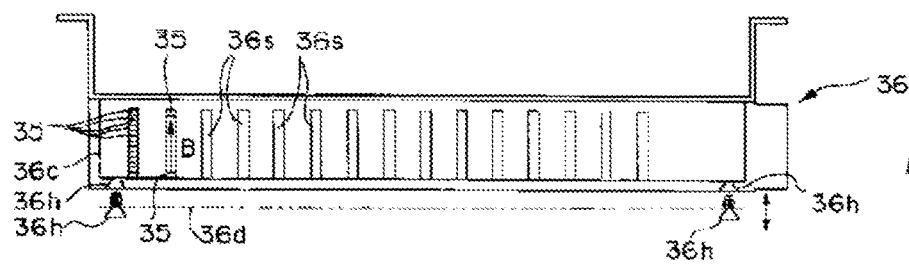
FIG. 7A is a plan view of a conventional unconnected fiber management unit of an optical distribution frame.
Figure 7B:
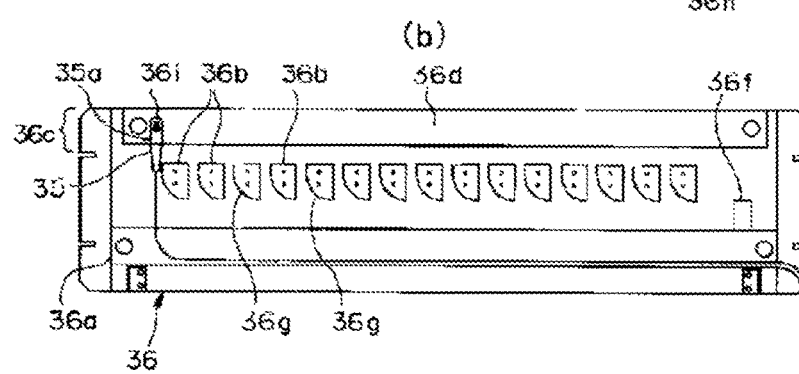
FIG. 7B is a front view of the conventional unconnected fiber management unit of FIG. 7A.
Figure 7C:
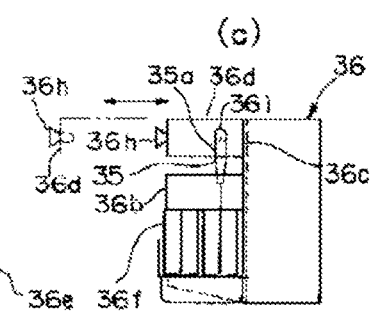
FIG. 7C is a side view of the conventional unconnected fiber management unit of FIG. 7A.
Figure 8:
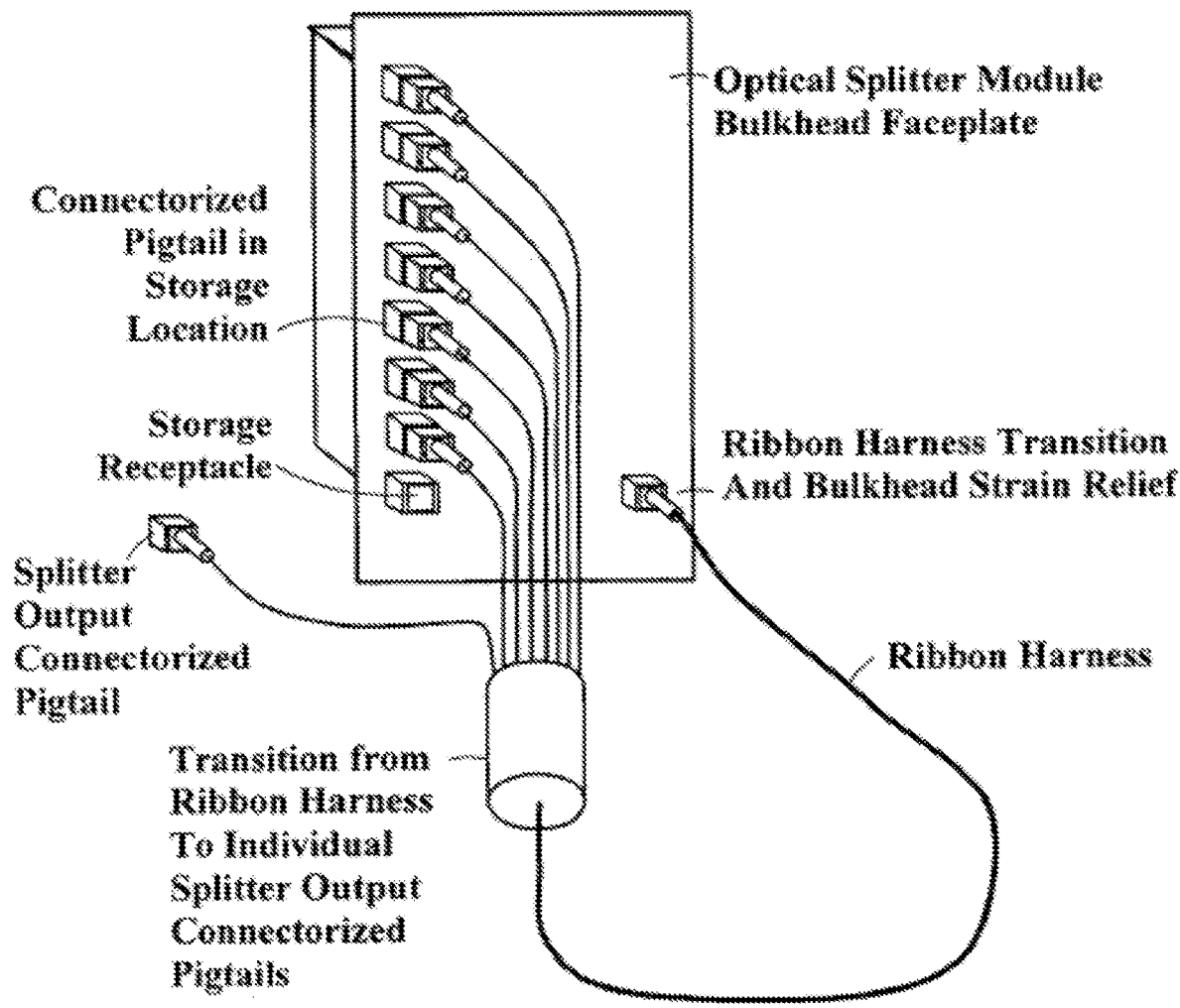
FIG. 8 illustrates a conventional optical splitter module in a fiber distribution network.

Referring now to FIGS. 5A and 5B, an exemplary fiber optic connector storage 200 may include a generally rectangular storage structure or holding structure 202, for example, a silicone rubber block, configured to receive and hold one or more fiber optic connectors. The storage structure 202 includes a front wall 203, a rear wall 204, a top wall 205, a bottom wall 206, a first end wall 207, and a second end wall 208. The first end wall 207 and the second end wall 208 extend from the front wall 203 to the rear wall 204 in a first direction and from the top wall 205 to the bottom wall 206 is a second direction that is perpendicular to the first direction. It should be appreciated that, in some aspects, the top wall 205 may be oriented as a bottom wall and the bottom wall 206 may be oriented as a top wall with respect to a support structure. The top wall 205, the bottom wall 206, the first end wall 207, and the second end wall 208 may have a substantially similar thickness. In some exemplary aspects, the thickness may fall, for example, within a range of about 1.0 mm to about 1.2 mm.

The storage structure 202 includes a plurality of engagement structures, for example, open-ended chambers or compartments 220, for example, cylindrical chambers or compartments, that each include an opening 221 at the front wall 203 and a perimeter wall 235 that extends from the opening 221 to the rear wall 204. The chambers 220 and openings 221 may have a circular or substantially circular cross-section, which may extend the length of the chambers 220 from the front wall 203 to the rear wall 204. For example, in some aspects, the perimeter of the chambers 220 and the openings 221 may be a polygon with a sufficient number of sides, for example, 16 sides, to substantially resemble a circle. It should be appreciated that the polygon may have more or less than 16 sides, depending on the size of the openings 221 and chambers 220. In some aspects, the openings 221 may be tapered.

The openings 221 and the chambers 220 are each sized and configured to receive a fiber optic connector 212 such as, for example, an SC (Subscriber Connector) fiber optic connector. It should be understood that the chambers 220 may be sized to accommodate various other fiber optic connectors.

The storage structure 202 includes first cutout portions 218 that define a plurality of first voids, cavities, or spaces 222 and/or second cutout portions 219 that define a plurality of second voids, cavities, or spaces 224. The first voids 222 may be between adjacent chambers 220 and adjacent the top wall 205. Partial first voids 223 may be between the end ones 220' of the plurality of chambers 220 and a respective one of the first end wall 207 and the second end wall 208. The second voids 224 may be between adjacent chambers 220 and adjacent the bottom wall 206. Partial second voids 225 may be between the end ones 220' of the plurality of chambers 220 and a respective one of the first end wall 207 and the second end wall 208. The first voids 222, partial first voids 223, second voids 224, and partial second voids 225 may be open at the front wall 203 and extend to the rear wall 204.

It should be appreciated that in some aspects, the storage structure 202 includes first voids 222 and partial first voids 223 but no second void 224 or partial second void 225. In other aspects, the storage structure 202 includes second voids 224 and partial second voids 225 but no first voids 222 or partial first voids 223. In still other aspects, the storage structure 220 may include only one first void 222 or partial first void 223 adjacent each chamber 220 and/or only one second void 224 or partial second void 225 adjacent each chamber 220.

The fiber optic connector storage 200 is configured to hold one or more fiber optic connectors 212 when the fiber optic connector 212 is not in use or "static." The perimeter wall 235 of each storage structure 202 may include one or more first wall portions or engagement features 226 between each chamber 220 and the first voids 222 and/or partial first voids 223. Additionally or alternatively, the perimeter wall 235 of each storage structure 202 may include one or more second wall portions or engagement features 227 between each chamber 220 and the second voids 224 and/or partial second voids 225. In some aspects, the first and second wall portions 226, 227 may have a thickness that is substantially similar to the thickness of the top wall 205, the bottom wall 206, the first end wall 207, and the second end wall 208, which may fall, for example, within a range of about 1.0 mm to about 1.2 mm.

The fiber optic connector 212 may be an SC connector that includes a connector housing 236 having a boot 240, and a ferrule 242 holding an optical fiber (not shown). The housing 236 of the fiber optic connector 212 may have a rectangular or substantially rectangular portion 237 having four corners 242. The chambers 220 of the storage structure 202 are configured to receive and securely hold the fiber optic connector 212, as discussed in more detail below.

The chambers 220 may be configured to secure the fiber optic connector 212 to the storage structure 202 via a friction fit or interference fit relationship between the corners 242 of the fiber optic connector 212 and the first and second wall portions 226, 227 of the perimeter wall 235 of the chamber 220. For example, the corners 242 of the fiber optic connector 212 may be more rigid than the first and second wall portions 226, 227 of the perimeter wall 235, and a circle that circumscribes the corners 242 of the fiber optic connector 212 may have a diameter that is greater than a diameter of the chamber 220 and/or the opening 221. When the connector 212 is inserted into the chamber 220, the corners 242 of the fiber optic connector 212 are configured to deform the first and second wall portions 226, 227 such that the first and second wall portions 226, 227 securely grip the fiber optic connector 212. For example, the first voids 222, partial first voids 223, second voids 224, and/or partial second voids 225 permit the first and second wall portions 226, 227 to deform into the respective first voids 222, partial first voids 223, second voids 224, and/or partial second voids 225. Because the gripping area between the first and second wall portions 226, 227 and the fiber optic connector 212 is limited to the corners 242 of the fiber optic connector 212, the gripping area is minimized and the force required to insert the fiber optic connector 212 into and remove the fiber optic connector 212 from the chamber 220 is reduced when compared with a connector holder that grips an area greater than the corners 242.

It should be appreciated that in some aspects, the corners 242 of the fiber optic connector 212 may engage the first and second wall portions 226, 227 of the perimeter wall 235 of the chamber 220 to secure the fiber optic connector 212 to the storage structure 202 via a friction fit or interference fit relationship without deforming the first and second wall portions 226, 227 of the perimeter wall 235'. In some aspects, the chambers 220 and openings 221 may be configured to move from a first position or rest position to a second position or expanded position when a fiber optic connector is fully inserted into the respective chamber. For example, the chambers 220 and openings 221 may be substantially circular in the first position. In the second position, the chambers 220 and openings 221 may be circular but have a larger diameter than in the first position or the chambers 220 and openings 221 may become non-circular shaped, for example, oval shaped.

The plurality of chambers 220 extend from the openings 221 at the front wall 203 to substantially closed ends 261 at the rear wall 204 of the storage structure 202. The perimeter walls 225 of the chambers 220 may be flexible such that the walls 225 are configured to deform when a fiber optic connector is inserted into the chambers 220, as described above. In some aspects, the storage structure 202 of the present disclosure may be injection molded such that the storage structure 202 is a single piece of unitary constructions. It is also understood that a dual-shot injection molding process may be implemented wherein the perimeter walls 225 of the plurality of chambers 220 are formed from a polymeric material having a lower modulus of elasticity compared to the polymeric material used for the front wall 203, the rear wall 204, the top wall 205, the bottom wall 206, the first end wall 207, and/or the second end wall 208.

In various embodiments of the disclosure, the plurality of chambers 220 may have a length from the openings 221 at the front wall 203 to the substantially closed end 261 at the rear wall 204 of the storage structure 202 that is sized to receive the fiber optic connector 212 with a dust cap 273 coupled with the connector 212 to cover the ferrule 241. It should be appreciated that the dust cap 273 may comprise a translucent material that permits a technician to visually observe whether the fiber in the ferrule 241 is active because the light traveling on the fiber illuminates the dust cap 273.

The substantially closed end 261 of one or more of the plurality of chambers 220 may include at least one opening 268 there through. The illustrated embodiment includes two openings 268 that are offset from a center of the substantially circular closed end 261 of the chambers 220. The openings 268 permit airflow between an interior 270 of the chambers 220 and an exterior 272 of the chambers 220 and the storage structure 202. The openings 268 thus prevent a vacuum effect from occurring when the connector 212 is inserted into a chamber 220 with the openings. The storage structure 202 may include a mounting structure 280 configured to mount the storage structure 202 to a panel or bulkhead of a fiber distribution system, as would be understood by persons skilled in the art.

In various aspects, the storage structure 202 may comprise a translucent material. Because the openings 268 are offset from a center of the substantially circular closed end 261 of the chambers 220, the openings 268 are also configured to be offset from the dust cap 273 of the connector 222 being inserted into the chamber 220. Thus, light traveling on the fiber that illuminates the dust cap 273 may also illuminate a region 269 of the substantially closed end 261 of the chamber 220 such that a technician can visually observe whether the fiber in the ferrule 241 is active by viewing from the exterior 272 of the storage structure 202.

In use, a first chamber 220' of the plurality of chambers 220 includes an opening 221' configured to receive the fiber optic connector 212. The first chamber 220' may be configured to secure the fiber optic connector 212 to the storage structure 202 via a friction fit or interference fit relationship between the corners 242 of the fiber optic connector 212 and the first and second wall portions 226', 227' of the perimeter wall 235' of the chamber 220'. For example, the corners 242 of the fiber optic connector 212 may be more rigid than the first and second wall portions 226', 227' of the perimeter wall 235', and a circle that circumscribes the corners 242 of the fiber optic connector 212 has a diameter greater than a diameter of the chamber 220' and/or the opening 221'. Thus, the first and second wall portions 226'. 227' are configured to deform in the regions that are proximate to the corners 242 of the fiber optic connector 212 when the connector 212 is inserted into the first chamber 220'. It should be appreciated that in some aspects, the corners 242 of the fiber optic connector 212 may engage the first and second wall portions 226', 227' of the perimeter wall 235' of the chamber 220' to secure the fiber optic connector 212 to the storage structure 202 via a friction fit or interference fit relationship without deforming the first and second wall portions 226', 227' of the perimeter wall 235'.

While exemplary, non-limiting embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A connector storage structurally configured to hold a fiber optic connector while minimizing a contact area between the connector storage and the connector comprising:

a storage block including a plurality of chambers;

wherein the storage block is configured to include a front wall, a rear wall, a top wall, a bottom wall, a first end wall, and a second end wall;

wherein each of the plurality of chambers is configured to include an open first end at the front wall and a substantially closed second end at the rear wall;

wherein the storage block is configured to include first voids between adjacent ones of the plurality of chambers and the top wall and second voids between the adjacent ones of the plurality of chambers and the bottom wall;

wherein the storage block is configured to include partial first voids between end ones of the plurality of chambers, the top wall, and a respective one of the first end wall and the second end wall;

wherein the storage block is configured to include partial second voids between end ones of the plurality of chambers, the bottom wall, and a respective one of the first end wall and the second end wall;

wherein each of the plurality of chambers includes a substantially circular perimeter wall;

wherein the perimeter wall includes first wall portions between the respective chamber and respective ones of the first voids and partial first voids and second wall portions between the respective chamber and respective ones of the second voids and partial second voids;

wherein each of the plurality of chambers is configured to receive a fiber optic connector via the open first end;

wherein the perimeter wall is configured to have a first diameter that is smaller than a second diameter of a circle that circumscribes corners of the fiber optic connector;

wherein the first wall portions and the second wall portions are configured to deform into respective ones of the first voids, the partial first voids, the second voids, and the partial second voids to receive and securely grip the corners of the fiber optic connector;

wherein the top wall of the storage block is configured to includes a plurality of notches at the front wall, and each of the notches is configured to extend into a respective one of the chambers;

wherein each of the notches is configured to receive a locking clip of the fiber optic connector when the fiber optic connector is inserted into the chamber of the storage block such that the clip can be inserted into the chamber beyond the front wall and does not extend beyond an outer surface of the top wall, thereby protecting the clip from damage during storage of the connector; and wherein each of the plurality of chambers is configured to securely hold the fiber optic connector while minimizing a contact area between the perimeter wall and the connector so as to reduce a force required to insert the connector into the storage block and remove the connector from the storage block.

2. The connector storage of claim 1, wherein the storage block is a single piece of unitary construction.

3. The connector storage of claim 1, wherein the storage block comprises a silicone rubber block.

4. The connector storage of claim 1, wherein each of the plurality of chambers is configured to receive an LC fiber optic connector.

5. The connector storage of claim 1, wherein the substantially closed second end includes an opening through the rear wall that permit airflow between an interior of the chamber and an exterior of the storage block.

6. A connector storage structurally configured to hold a fiber optic connector while minimizing a contact area between the connector storage and the connector comprising:
a storage structure including a compartment configured to receive a fiber optic connector;
wherein the compartment is configured to include an open first end at a front wall and a substantially closed second end at a rear wall;
wherein the storage structure is configured to include a plurality of voids surrounding the compartment;
wherein the compartment includes a substantially circular perimeter wall;
wherein the perimeter wall includes wall portions between the compartment and each of the plurality of voids;
wherein the compartment is configured to receive a fiber optic connector via the open first end;
wherein the perimeter wall is configured to have a first diameter that is smaller than a second diameter of a circle that circumscribes corners of the fiber optic connector;
wherein the wall portions are configured to deform into respective ones of the voids to receive and securely grip the corners of the fiber optic connector; and
wherein the compartment is configured to securely hold the fiber optic connector while minimizing a contact area between the perimeter wall and the connector so as to reduce a force required to insert the connector into the storage structure and remove the connector from the storage structure.

7. The connector storage of claim 6, wherein a top wall of the storage structure is configured to include a notch at the front wall that is configured to extend into the compartment; and
wherein the notch is configured to receive a locking clip of the fiber optic connector when the fiber optic connector is inserted into the compartment of the storage structure such that the clip can be inserted into the compartment beyond the front wall and does not extend beyond an outer surface of the top wall, thereby protecting the clip from damage during storage of the connector.

8. The connector storage of claim 6, wherein the storage structure is a single piece of unitary construction.

9. The connector storage of claim 6, wherein the storage structure comprises a silicone rubber block.

10. The connector storage of claim 6, wherein the compartment is configured to receive an LC fiber optic connector.

11. The connector storage of claim 6, wherein the compartment is configured to receive an SC fiber optic connector.

12. The connector storage of claim 6, wherein the substantially closed second end includes an opening through the rear wall that permit airflow between an interior of the compartment and an exterior of the storage block.

13. The connector storage of claim 6, wherein the compartment includes a plurality of compartments and wherein the voids include first voids between adjacent ones of the plurality of compartments and a top wall of the storage structure and second voids between the adjacent ones of the plurality of compartments and a bottom wall of the storage structure;
wherein the storage structure is configured to include partial first voids between end ones of the plurality of compartments, the top wall, and a respective one of a first end wall and a second end wall; and
wherein the storage structure is configured to include partial second voids between end ones of the plurality of compartments, the bottom wall, and a respective one of the first end wall and the second end wall.

14. A connector storage structurally configured to hold a fiber optic connector while minimizing a contact area between the connector storage and the connector comprising:
a storage portion including a a connector receiving portion and an engagement portion:
wherein the connector receiving portion is structurally configured to receive an a fiber optic connector;
wherein the engagement portion is structurally configured to engage a portion of the fiber optic connector, deform into an engagement portion receiving portion outside of the connector portion, and securely grip the fiber optic connector; and
wherein the engagement portion is structurally configured to securely hold the fiber optic connector while minimizing a contact area between the engagement portion and the connector so as to reduce a force required to insert the connector into the storage portion and remove the connector from the storage portion.

15. The connector storage of claim 14, wherein the storage portion includes a substantially circular perimeter wall;
wherein the perimeter wall is configured to have a first diameter that is smaller than a second diameter of a circle that circumscribes the engagement features of the fiber optic connector.

16. The connector storage of claim 14, wherein a top wall of the storage portion is configured to include a receiving portion at a front wall of the storage portion that is configured to extend into the connector receiving portion; and
wherein the receiving portion is configured to receive a locking clip of the fiber optic connector when the fiber optic connector is inserted into the connector receiving portion such that the clip can be inserted into the connector receiving portion structure beyond the front wall and does not extend beyond an outer surface of the top wall, thereby protecting the clip from damage during storage of the connector.

17. The connector storage of claim 14, wherein the storage portion comprises a single piece of unitary construction.

18. The connector storage of claim 14, wherein the storage portion comprises a silicone rubber block.

19. The connector storage of claim 14, wherein the connector receiving portion is structurally configured to receive an LC fiber optic connector.

20. The connector storage of claim 14, wherein the connector receiving portion is structurally configured to receive an SC fiber optic connector.

21. The connector storage of claim 14, wherein the connector receiving portion is configured to include an open first end at a front wall of the storage portion and a substantially closed second end at a rear wall of the storage portion.

22. The connector storage of claim 21, wherein the substantially closed second end includes an opening through the rear wall structurally configured to permit airflow between an interior of the connector receiving portion and an exterior of the storage portion.

23. The connector storage of claim 14, wherein the engagement portion receiving portion comprises a void proximate the engagement portion; and
  wherein the void is configured to permit the engagement portion to deform into the void to receive and securely grip the engagement portion of the fiber optic connector.

24. The connector storage of claim 23, wherein the engagement portion includes a plurality of engagement portions and wherein the void includes first voids between adjacent ones of the plurality of engagement portions and a top wall of the storage portion and second voids between the adjacent ones of the plurality of engagement portions and a bottom wall of the storage portion;
  wherein the storage portion is configured to include partial first voids between end ones of the plurality of engagement portions, the top wall, and a respective one of a first end wall and a second end wall; and
  wherein the storage portion is configured to include partial second voids between end ones of the plurality of engagement portions, the bottom wall, and a respective one of the first end wall and the second end wall.

* * * * *